US008661009B2

(12) United States Patent
Hamilton et al.

(10) Patent No.: US 8,661,009 B2
(45) Date of Patent: Feb. 25, 2014

(54) DYNAMIC REAL-TIME REPORTS BASED ON SOCIAL NETWORKS

(75) Inventors: Rick A. Hamilton, Charlottesville, VA (US); Brian M. O'Connell, Research Triangle Park, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 12/793,286

(22) Filed: Jun. 3, 2010

(65) Prior Publication Data

US 2011/0302144 A1     Dec. 8, 2011

(51) Int. Cl.
*G06F 17/30*     (2006.01)

(52) U.S. Cl.
USPC ............................................... 707/705

(58) Field of Classification Search
USPC ................. 707/706, 736, 802, 705
See application file for complete search history.

(56) References Cited

U.S. PATENT DOCUMENTS

| | | | | |
|---|---|---|---|---|
| 7,399,276 | B1 * | 7/2008 | Brown et al. | 600/300 |
| 7,716,140 | B1 * | 5/2010 | Nielsen et al. | 705/319 |
| 7,949,611 | B1 * | 5/2011 | Nielsen et al. | 705/319 |
| 2002/0052873 | A1 | 5/2002 | Delgado et al. | |
| 2007/0226248 | A1 | 9/2007 | Darr et al. | |
| 2008/0082393 | A1 | 4/2008 | Ozzie et al. | |
| 2008/0177834 | A1 * | 7/2008 | Gruhl et al. | 709/204 |
| 2008/0228768 | A1 * | 9/2008 | Kenedy et al. | 707/6 |
| 2008/0228824 | A1 * | 9/2008 | Kenedy et al. | 707/104.1 |
| 2009/0204601 | A1 * | 8/2009 | Grasset | 707/5 |

(Continued)

OTHER PUBLICATIONS

Huisman et al., "Software for Social Network Analysis", ICS/Statictics & Measurement Theory, University of Groningen, Oct. 3, 2003.
"Happiness is contagious in social networks", http://www.cnn.com/2008/HEALTH/12/05/happiness.social.network/index.html, 2 pages, Dec. 2008.
"Are Your Friends Making you Fat?", 3 pages, Sep. 10, 2009.
"Social Network Analysis (SNA)", http://www.fmsasg.com/SocialNetworkAnalysis/, 5 pages, 2001.

(Continued)

*Primary Examiner* — Cam-Linh Nguyen
(74) *Attorney, Agent, or Firm* — Ryan, Mason & Lewis, LLP (57) ABSTRACT

A system for analyzing social networks includes a memory storing a social network data structure, a correlation engine, a trigger function module, and a reporting module. The social network data structure includes a plurality of attributes, a plurality of nodes, each of the nodes corresponding to an entity and having at least one of the attributes associated with the entity, and at least one connection connecting at least two of the nodes. The system also includes at least one processor, coupled to the memory. The at least one processor is operative to execute the correlation engine to examine at least one of the nodes as a subject node. The subject node is coupled to at least one other one of the nodes, comprising a data node, by at least the at least one connection. The examination by the correlation engine is carried out to determine at least one of the attributes comprising a related attribute of the subject node and the at least one other one of the nodes, comprising the data node. The at least one processor is also operative to execute the trigger function module to determine if the reporting module should be executed to provide the report. Further, responsive to determining that the reporting module should be executed, the at least one processor is operative to execute the reporting module to provide a report indicating a correlation assessment to the subject node, the correlation assessment being related to the at least one related attribute. A method, apparatus, and computer program product are also provided.

26 Claims, 3 Drawing Sheets

(56) References Cited

U.S. PATENT DOCUMENTS

| | | | |
|---|---|---|---|
| 2009/0216860 A1* | 8/2009 | Li et al. | 709/219 |
| 2009/0307181 A1* | 12/2009 | Colby et al. | 706/54 |
| 2009/0326981 A1 | 12/2009 | Karkanias et al. | |
| 2010/0070335 A1 | 3/2010 | Parekh et al. | |
| 2010/0153175 A1 | 6/2010 | Pearson et al. | |
| 2010/0175006 A1* | 7/2010 | Li | 715/764 |
| 2010/0306271 A1* | 12/2010 | Shmueli et al. | 707/798 |
| 2011/0118554 A1* | 5/2011 | Stakutis et al. | 600/300 |
| 2011/0153368 A1* | 6/2011 | Pierre et al. | 705/4 |
| 2011/0173051 A1* | 7/2011 | Dey et al. | 705/7.39 |
| 2011/0246574 A1* | 10/2011 | Lento et al. | 709/204 |
| 2011/0270774 A1* | 11/2011 | Varshavsky et al. | 705/319 |
| 2011/0270845 A1* | 11/2011 | Lin et al. | 707/748 |
| 2011/0295626 A1* | 12/2011 | Chen et al. | 705/7.11 |

OTHER PUBLICATIONS

"Centrality", http://en.wikipedia.org/wiki/Centrality, 6 pages, Apr. 23, 2010.

"Social network", http://en.wikipedia.org/wiki/Social_network, 12 pages, May 14, 2010.

"INSA—Social Network Analysis Software", http://www.insna.org/software/index.html, 5 pages, May 25, 2008.

"International Network for Social Network Analysis", http://www.insna.org/, 2 pages, 2008.

"Social network analysis software—Wikipedia, the free encyclopedia", http://en.wikipedia.org/wiki/Social_network_analysis_software, 23 page May 10, 2010.

\* cited by examiner

DYNAMIC REAL-TIME REPORTS BASED ON SOCIAL NETWORKS

FIELD OF THE INVENTION

The present invention relates to the electrical, electronic and computer arts, and, more particularly, to social networks and the like.

BACKGROUND OF THE INVENTION

The notion of a social network has turned out to be useful for explaining many real-world phenomena. A social network is a social structure usually made of individuals, groups of individuals, or organizations corresponding to "nodes," which are tied (connected) by one or more specific types of interdependency, such as friendship, kinship, knowledge, and the like. "Online" friends and acquaintances may have significant influence on people; perhaps as much as friends who are interacted with using traditional modes of interaction, such as face-to-face interactions that do not involve computing technologies.

SUMMARY OF THE INVENTION

Principles of the invention provide techniques for dynamic real-time reports based on social networks. In one aspect, an exemplary system for analyzing social networks includes a memory storing a social network data structure, a correlation engine, a trigger function module, and a reporting module. The social network data structure includes a plurality of attributes, a plurality of nodes, each of the nodes corresponding to an entity and having at least one of the attributes associated with the entity, and at least one connection connecting at least two of the nodes. The system also includes at least one processor, coupled to the memory. The at least one processor is operative to execute the correlation engine to examine at least one of the nodes as a subject node. The subject node is coupled to at least one other one of the nodes, comprising a data node, by at least the at least one connection. The examination by the correlation engine is carried out to determine at least one of the attributes comprising a related attribute of the subject node and the at least one other one of the nodes, comprising the data node. The at least one processor is also operative to execute the trigger function module to determine if the reporting module should be executed to provide a report. Responsive to determining that the reporting module should be executed to provide the report, the at least one processor is further operative to execute the reporting module to provide the report indicating a correlation assessment to the subject node, the correlation assessment being related to the at least one related attribute.

In another aspect, an exemplary method for analyzing social networks includes the step of providing a system, wherein the system comprises distinct software modules. Each of the distinct software modules is embodied on a computer-readable storage medium, and the distinct software modules comprise a data collection module, an analysis module, a trigger function module, and a reporting module. An additional step includes executing the data collection module on at least one hardware processor to obtain a social network data structure having: a plurality of attributes; a plurality of nodes; and at least one connection connecting at least two of the nodes. Each of the nodes corresponds to an entity and has at least one of the attributes associated with the entity. A further step includes executing the analysis module on the at least one hardware processor to examine at least one of the nodes as a subject node. The subject node is coupled to at least one other one of the nodes, comprising a data node, by at least the at least one connection. The examination by the analysis module is carried out to determine at least one of the attributes comprising a related attribute of the subject node and the at least one other one of the nodes, comprising the data node. A still further step includes executing the trigger function module to determine if the reporting module should be executed to provide a report. Responsive to determining that the reporting module should be executed to provide the report, a still further step includes executing the reporting module on the at least one hardware processor to provide a report indicating a correlation assessment to the subject node, the correlation assessment being related to the at least one related attribute.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects and advantages of the invention will become apparent from the following detailed description of illustrative embodiments thereof, which is to be read in connection with the accompanying drawings.

DETAILED DESCRIPTION OF PREFERRED EMBODIMENTS

As noted, one or more embodiments of the invention provide a system and method that utilizes a dynamic assessment of social networks. One or more embodiments of the invention include: a data collection module for collecting and storing social network users' information, an analysis module for analyzing social networks, and a reporting module. A service in accordance with one or more embodiments of the invention provides an automatic assessment of social networks; one or more instances may have particular applicability in connection with the rise of web sites and tools involved with social networking. Analysis and data collection may make use of cloud computing paradigms, wherein shared resources, software and information are provided remotely to computers and other devices on-demand. Cloud computing is a paradigm and technology that often involves the use of the Internet and remote servers to maintain data and software applications.

One or more embodiments of the invention provide a dynamic, real-time feedback system that uses social networks and can be used, for example, by people interested in discovering their own health issues and sharing that information with their healthcare providers. This system for analyzing social networks can make use of at least one central processing unit, at least one network, and at least one network connection. In one or more instances, the system includes an electronic social network, in turn including: (i) users of a report-generation system, (ii) their friends, and (iii) connections between such users and their friends. Here, the term "friend" need not imply that users actually have a traditional friendship with these "friends"—who may be relatively or totally unknown to the users. These friends are connected in some fashion according to some criteria. The electronic social network includes at least one data node having at least one attribute associated with an entity (for example, information associated with each user) and at least one connection that will connect two or more of the data nodes. The information about this electronic social network might be stored in a memory, for example, as a data structure. In addition, one or more embodiments include an analysis module that will examine each connected node to determine at least some (and preferably all) related attributes of two or more of the connected nodes; as well as a reporting process that will provide a report indicating a correlation assessment, where the correlation assessment is related to the related attributes. It must be noted that in some instances related attributes could be identical.

One preferred implementation is an "opt-in" system, where users provide their explicit consent for each and every use of information that relates to them. In this implementation an "opt-in" assent could be received before any attributes will be stored in the memory. Yet another implementation can make use of anonymizing techniques to mask the identities of all users. As used herein, "anonymizing techniques" include techniques for not revealing user identities from Web servers, in which the server does not log the internet protocol (IP) address of the individual and does not store any information about the user. The server only stores the data. Anonymizing may also simply entail the user specifying an alias or generic identity that does not actually identify the user's actual name. In some cases, groups of users may be combined into one alias to provide additional protection.

The term "entity" in a network is intended to include more than just a person. In one or more embodiments of the invention an entity might be a business, a product, a service, an avatar in a virtual world, or even a collection of persons. In those instances where the entity is a person, one or more attributes associated with that entity might be one of the following: professional information, skill information, health information, preference information, and the like.

As an example, note that if the correlation engine determines that a user has a significant number of book authors, engineers, or copyeditors in a portion of the user's social network, the reporting module may generate a report regarding this finding, and this report may be sent to the user or the user's designated report receiver. This may be useful for a user assessing the kinds of connections and potential influencers of the user's behavior. It also may provide the user with information that the user can use to obtain assistance, such as assistance in editing a book or finding a job.

One exemplary application where analysis of real-life social networks is advantageous is the healthcare discipline. It should be noted that recent research involving social networks indicates that a person's health habits not only affect his or her own health but have a direct and measurable impact on members of his or her social network. Moreover, this effect has been found to extend to the social network of members of the immediate social network. For example, recent studies have shown that social networks can have a much bigger impact on health behaviors than previously suspected. As one example, an individual's decision to stop smoking is strongly affected by whether people in his or her social network quit— even by people they don't know personally. In fact, entire social networks of smokers appear to quit almost simultaneously, according to the researchers, medical sociologist Nicholas Christakis of Harvard Medical School and political scientist James Fowler of the University of California at San Diego. As another example, obesity can follow a pattern within social groups, appearing in one person and 'spreading' to another in a "viral" fashion. For a more detailed discussion of these research studies, see, Thompson C., Are Your Friends Making You Fat? The New York Times Magazine, Sep. 10, 2009.

In addition, researchers have used one of the most popular social networks, the Facebook® network, for various social network studies (registered mark of Facebook, Inc., 1601 South California Avenue, Palo Alto, Calif. 94304, USA). Facebook is a social networking website that is operated and privately owned by Facebook, Inc. For example, researchers curious about the spread of happiness looked at users who smile in their profile pictures. They found that "smiling profiles cluster in much the same way as happiness clusters in the Framingham Heart Study." For a more detailed discussion of this study, see, Landau E., Happiness is Contagious in Social Networks, from the CNN web site Dec. 5, 2008.

Furthermore, researchers have shown that even people a person never meets, for example friend's friends, can "make" that person quit smoking, eat too much, become happy, and the like. This phenomenon might be explained by the tendency of individuals to associate and bond with other individuals who are like them. This happens in both "real life" and in purely electronic social networks. Physical closeness does not appear to be a key factor. For example, with respect to obesity, spouses do not appear to have as big an effect on each other as friends. Some researchers believe that a behavior can skip links. For instance, a behavior might spread to a friend of a friend without affecting the person who connects them. In one or more embodiments, at least one of the data nodes is connected to the subject node through a path containing two or more data nodes and two or more connections. It must be noted that the subject node represents the entity about which an assessment is made and report is generated. In a simple scenario, by way of example and not limitation, suppose that the objective is to get an assessment of a node identified as Subject A. Subject A may have a friend, namely Friend 1, and Subject A is socially connected to Friend 1. Furthermore, Friend 1 may have Friend 2. Friend 1 and Friend 2 are socially connected with each other as well. In this instance, Friend 1 and Friend 2 constitute data nodes, because they provide the data needed for an assessment related to the subject node, Subject A.

One significant aspect of one or more embodiments of the invention is provision of a report service to social network members, and optionally to other parties, based upon an analysis of social networks and various attributes (characteristics) of their members. This service may be provided by a service provider and provided either free or for a fee, for users who opt in for such service. For example, users may wish to know if they are at risk based upon an analysis of their social networks.

The report service may include any of the following: an email sent to a user, a posting on a social network page, an instant message, a fax, a phone call, a specific sound. A report may also be implemented as a change of color on a GUI interface. For example, an indicator may appear on a computer screen to notify users about risk factors identified by the system. In a preferred embodiment, the reporting process includes a trigger function that receives information from the correlation engine to determine if a report should be generated.

In a simple scenario, by way of example and not limitation, social network users may provide information on specific attributes, such as their habits, skills, health care related parameters and the like. These attributes may be used to estimate the ramifications on, for example, health, based on a network analysis. One or more embodiments of the invention may provide a report service in an anonymous way so that the association of smoking to a particular user is never made available beyond an analysis module. Additional factors that may be utilized for exemplary, healthcare related, analysis may include: body mass index (BMI), blood pressure, resting pulse rate, exercise frequency and/or intensity, tobacco use, reported and known medical conditions, and the like.

Given the teachings herein, the skilled artisan will be able to implement one or more techniques for gathering attributes required for analysis, such as user entry, surveys and polls.

One significant aspect of one or more embodiments of the invention is that various mechanisms are provided to implement a report service. For instance, such reports might be either periodic or event driven. Periodic reports might be generated at regular intervals specified by users such as every day, week, month, and the like. On the other hand, event driven reports might be implemented by utilizing one or more triggering mechanisms. One or more embodiments of the invention enable users to define various scopes of triggers that fire in response to various events (threshold conditions). For example, users may wish to know if they are at risk, with respect to obesity, based upon an analysis of their social networks. If an analysis module determines that cumulative body weight of N users of a social network exceeds a certain value, and these users are within a certain social-network "proximity," a trigger fires and a report can automatically be sent to one or more users. In this example, the condition of cumulative body weight exceeding a certain value represents a threshold condition which is pre-defined by users. As noted, an event driven report will not be generated unless a threshold condition has been met.

For instance, a group of Facebook site users might want to organize a weekend bicycle camping tour for advanced bicycle riders. The campground might provide a discount if there are at least fifty people in the group. The organizers might be interested in analyzing profiles of their Facebook site friends to find out if there are a sufficient number of people whose interests include bicycling. In this instance, there may be no need to send a report unless there are at least fifty people found among the organizers' first-degree and/or their second degree friends.

While in the foregoing embodiment users define threshold conditions, it should be noted that other techniques also may be used. For example, the threshold conditions may be set by a third party, a company, a profile, and the like.

It should also be noted that an analysis module could determine proximity by assessments of network connectivity including such measures as "betweenness centrality," "closeness," and "eigenvalue." Terms such as "betweenness centrality", "closeness" and "eigenvalue" are well-known in the art of social network analysis.

As will be appreciated by the skilled artisan, betweenness centrality identifies the position of an entity within a network in terms of the ability of the entity to make connections to other pairs or groups in the network. Thus, an entity with a high betweenness centrality will typically have a greater amount of influence over occurrences in the network, hold a favorable position and/or a position of power in the network, and may represent a single point of failure, in the sense that removing the single betweenness spanner from a network may sever ties between different cliques. Betweenness centrality thus views an entity as being in a favored position when the entity lies on the geodesic paths between other pairs of entities in the network.

As will also be appreciated by the skilled artisan, closeness centrality measures the speed with which an entity can access additional entities within the network. Thus, an entity with a high closeness centrality will typically have a short path to the other entities, be close to other entities, have fast access to the other entities in the network, and have a high level of visibility as to occurrences within the network. Closeness centrality approaches thus consider the distance of an entity to all others in the network by considering the distance from each entity to all others.

Furthermore, as will again be appreciated by the skilled artisan, Eigenvalue measures how close a particular entity is to other entities within the network that are highly close. That is to say, Eigenvalue identifies those entities that are most central in terms of the global or overall make-up of the network. A high Eigenvalue will typically provide a reasonable measure of one aspect of centrality in terms of positional advantage, and will typically indicate an actor that is more central to the main pattern of distances among all the entities. The eigenvector approach thus seeks to find the most central entities (i.e. those with the smallest farness from other entities) in terms of the "global" or "overall" structure of the network, and to pays reduced attention to patterns that are more "local."

The skilled artisan will appreciate that a number of commercially available social network analysis software packages are available, which can be used to calculate closeness, betweenness centrality, eigenvalue measurements and the like; a non-limiting example is FMS Advanced Systems Group Social Network Analysis (SNA) Software with Sentinel Visualizer available from FMS Inc. of Vienna, Va., USA. The International Network for Social Network Analysis, c/o Department of Communication, University of California, Davis, Calif., USA lists many packages on its web site.

In one or more embodiments of the invention, a settable threshold condition may be obtained from a user by implementing a user interface control such as, for example, a dial (e.g., low, medium, high). The dial could be multidimensional. In other words, the dial could be implemented to control each of the following: a risk level, the depth to which the social network is searched, and the nature of connection between nodes. For example, users might desire not to count friends with whom they had no contact for one year. According to a further aspect of the invention, the service provider might implement a pricing model in which users' closest friends would be analyzed for free, but a deeper analysis of "friends of friends" would require a fee.

One significant aspect of one or more embodiments of the invention is that various mechanisms are provided to interrelate various types of social networks. In this regard, social networks may include, without limitation, email, instant messaging, Facebook social networking web site, Twitter social networking service and other such networks. In accordance with embodiments of the present invention, each social network may have its own interface. Each interface may be implemented as having different level of access to users' information. One or more embodiments of the invention allow to access and analyze two or more social networks simultaneously, each social network being accessed through a different one of the interfaces. For example, users might want to include all of their Facebook social networking web site friends, Twitter social networking service friends, and email friends for various types of assessments.

Figure 1:
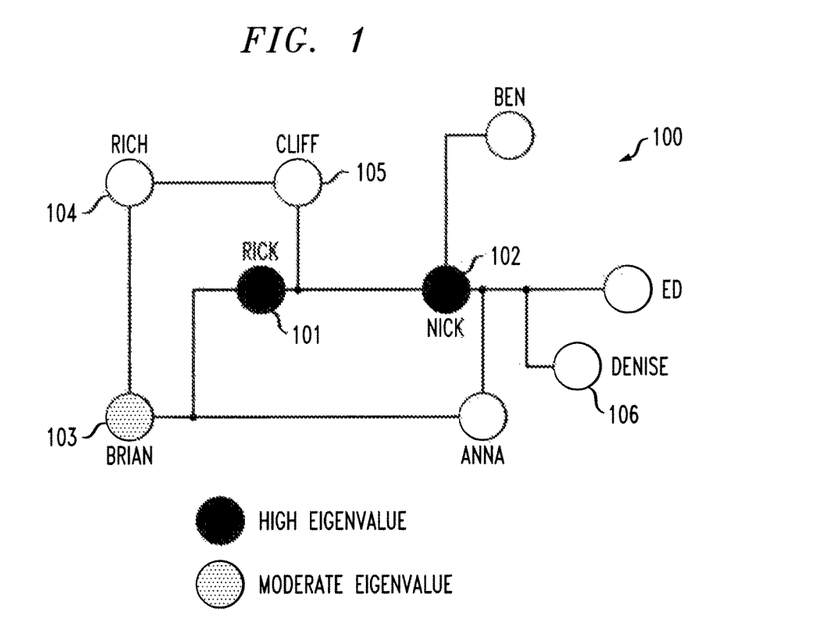
FIG. 1 shows exemplary high level diagram illustrating interactions of entities in a social network.

FIG. 1 is a high level diagram illustrating interactions of nodes in a social network 100 with reference to a non-limiting example. This example illustrates how an exemplary embodiment of the invention utilizes social network analysis measures for a sample social network. In the non-limiting example of FIG. 1, the nodes in the network are the users of that network, such as Rick 101, Nick 102, Brian 103, Rich 104, Cliff 105, Denise 106, and additional individuals not separately numbered (for brevity and avoidance of clutter). The links show the relationships between the nodes. Two nodes are connected if they interact with each other in some way. For example, Cliff 105 regularly interacts with Rich 104, but not with Denise 106. Therefore Cliff 105 and Rich 104 are connected, but there is no link between Cliff 105 and Denise 106.

A significant component of one or more embodiments of the invention, the analysis module, uses measures described above, such as betweenness centrality, closeness, and eigenvalue, to measure the links between the nodes. FIG. 1 illustrates how the eigenvalue measure could be utilized to analyze a social network. Eigenvalue measures how close a node is to other highly close nodes within a network. In other words, eigenvalue identifies the most central nodes in terms of the global or overall makeup of the network. In the example of FIG. 1, Rick 101 and Nick 102 are closer to other highly close nodes in the network. Brian 103 and Rich 104 are also highly close, but to a lesser degree. Brian exhibits a moderate eigenvalue while Rick and Nick have a high eigenvalue.

Figure 2:
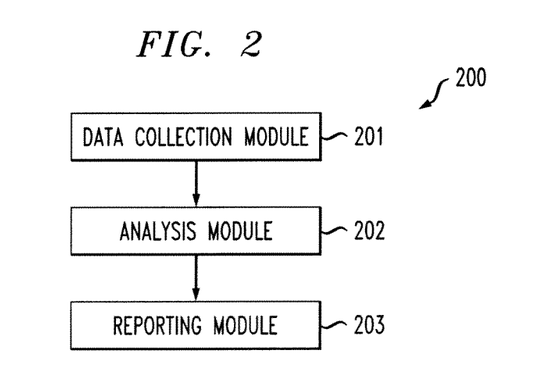
FIG. 2 is a block diagram illustrating an exemplary embodiment, according to an aspect of the invention.

FIG. 2 is a block diagram illustrating an exemplary embodiment of a system 200, according to an aspect of the invention. By way of illustration, FIG. 2 depicts a data collection module 201, an analysis module 202, and a reporting module 203. A data collection module 201 collects and stores various attributes provided by social network users. For example, users may provide, by way of example and not limitation, various specific characteristics, such as their habits, skills or health care related parameters. An analysis module 202 analyzes social networks. This module examines each connected node and performs the assessment of correlation between various nodes by using measures well-known to a skilled artisan, such as betweenness centrality, closeness, eigenvalue, and the like. A reporting module 203 provides a report service to social network members based upon information furnished by the analysis module 202.

Data collection module 201 can be implemented in any of a number of well-known database packages, such as, by way of example and not limitation, IBM DB2® software (registered mark of International Business Machines Corporation, Armonk, N.Y., USA). Data can be entered, for example, via a graphical user interface, prompting people via e-mail, and so on.

Analysis module 202 can be implemented, for example, by the above-mentioned commercially available social network analysis software packages with a suitable interface to the data collection module.

In one or more embodiments of the invention, the reporting module 203 may be implemented in various ways in terms of various platforms and architectures. In this regard, architectures may include, without limitation, web services, client-server and other such architectures. The reporting module 203 takes the analysis information provided by the analysis module 202 and delivers it to the requested individuals, such as healthcare providers, social network users, and the like. In accordance with embodiments of the present invention, each social network may have its own interface, as described above. Thus, by way of example and not limitation, reports may be delivered through email interface, text messaging interface, twitter interface. Additionally, Web browsers or Web browser plug-in software may be used to provide such reports to users. For example, a browser may have a feature in which, at the user's request, an analysis of social networks is performed, and the report or alert provided in the browser window. One preferred implementation may provide a report service which updates a "health portal." This delivery method is beneficial, because a "health portal" provides a central location where healthcare professionals and patients can share and analyze information.

Embodiments of the invention may be employed with a wide variety of social networks. Non-limiting examples include: the Twitter social networking service, e-mail patterns (e.g. e-mails sent back and forth), instant message patterns, Facebook social network patterns, and the like. For example, one type of social network would be like instant messaging or texting (e.g., well-known IBM Lotus Sametime instant messaging software), another might involve posting with selected viewing (e.g., Facebook social network), another might be interactive (e.g., well-known Second Life virtual world). For example, in a virtual world, an individual is represented by an avatar who has friends and acquaintances in the virtual world. Additionally, the avatar may come in close proximity with other avatars during a traversal of the virtual world. The networks of avatars within a virtual world may form a social network based on proximity and other criteria. In some cases, these kinds of analyses may be useful to detect, with a certain probability, possible areas of a social network prone to inappropriate behavior—for example when a significant portion of individuals in a network have certain characteristics that are correlated with such behavior; this aspect might be useful, under appropriate circumstances, in law enforcement or for parents to monitor minor children.

Of course, when implementing embodiments of the invention, due regard should always be paid to all pertinent legal and ethical standards pertaining to the use of data from social networks and the like.

Given the discussion thus far, it will be appreciated that, in general terms, an exemplary system for analyzing social networks, according to an aspect of the invention, includes a memory 304 (discussed further below and understood to include the possibility of multiple memories) storing a social network data structure (indicative, e.g., of social network 100). The social network data structure has a plurality of attributes and a plurality of nodes (e.g., 101-106). Each of the nodes corresponds to an entity and has at least one of the attributes associated with the entity. The data structure also includes at least one connection connecting at least two of the nodes. The memory further stores a correlation engine (e.g., analysis module 202); a trigger function module (e.g., code corresponding to decision blocks 410, 412, and/or 414, in communication with at least module 203 and optionally the other modules) and a reporting module 203. The exemplary system further includes at least one processor 302, coupled to the memory.

The at least one processor is operative to execute the correlation engine to examine at least one of the nodes as a subject node (i.e., a person or other entity about whom information is desired). The subject node is coupled to at least one other node, which is, in relation to the subject node, a data node (i.e., a "friend" of the subject node), by at least the at least one connection (i.e., the at least one connection is all or part of the connection between the subject node and data node).

Optionally, the data node is connected to the subject node through a path comprising at least two interconnected nodes.

The examination by the correlation engine is carried out to determine at least one of the aforementioned attributes that is a related attribute of the subject node and the data node(s). The at least one processor is further operative to execute the trigger function module to determine if the reporting module should be executed to provide the report. Responsive to determining that the reporting module should be executed to provide the report, the at least one processor is still further operative to execute the reporting module 203 to provide the report. The report indicates a correlation assessment to the subject node. The correlation assessment is related to the at least one related attribute.

Furthermore, given the discussion thus far, it will be appreciated that, in general terms, an exemplary method for analyzing social networks, according to another aspect of the invention, includes the step of providing a system, wherein the system comprises distinct software modules. Each of the distinct software modules is embodied on a computer-readable storage medium, and the distinct software modules comprise a data collection module 201, an analysis module 202, a trigger function module such as that described above, and a reporting module 203. An additional step includes executing the data collection module on at least one hardware processor to obtain a social network data structure as described above. Refer to steps 402 and 404 of FIG. 4. An additional step (e.g., step 406) includes executing the analysis module on the at least one hardware processor to examine at least one of the nodes as a subject node, coupled to one or more other nodes, comprising data node(s) with respect to the subject node, by at least the at least one connection, as described above. The examination by the analysis module is carried out to determine at least one of the attributes which is a related attribute of the subject node and the data node(s). A further step such as step 410 or steps 412, 414, for example, includes executing the trigger function module on the at least one hardware processor to determine if the report module should be executed to provide the report. If such is the case, further step 416 includes executing the reporting module 203 on the at least one hardware processor to provide a report indicating a correlation assessment to the subject node, the correlation assessment being related to the at least one related attribute.

Figure 4:
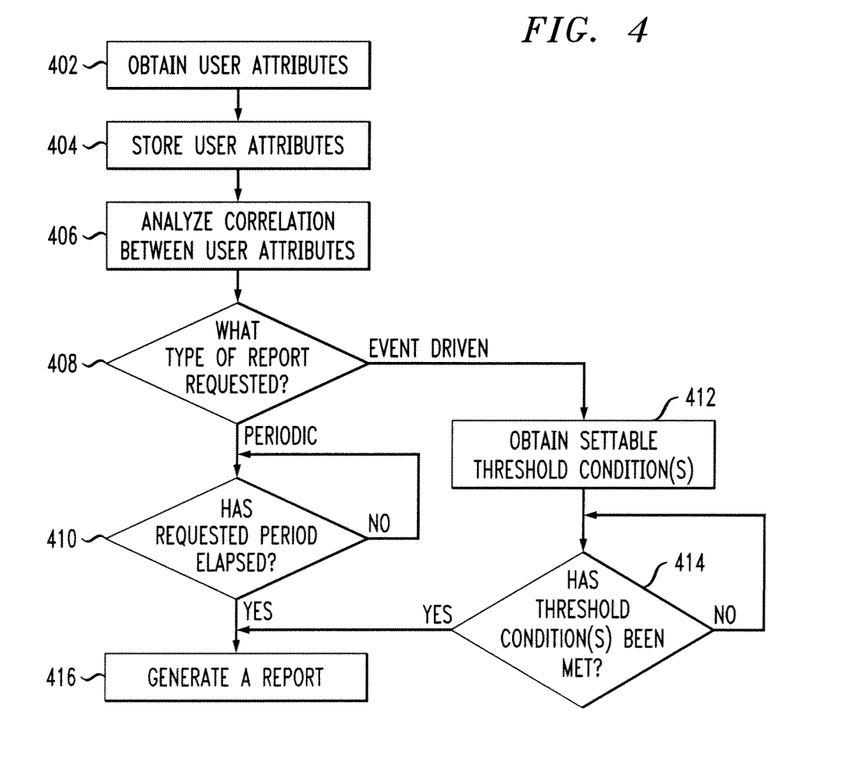
FIG. 4 is a flow chart of exemplary method steps, according to an aspect of the invention.

Exemplary aspects of steps 408-414 are discussed further below.

In some instances, the at least one related attribute comprises an identical attribute.

In some instances, a further step (which the at least one processor may be operative to perform) includes requiring an opt-in assent before the attributes are stored in the memory.

In one or more embodiments, the entity comprises at least one of: a person, a business, a product, a service, an avatar in a virtual world, and a collection of persons. In some cases where the entity comprises a person, at least one of the attributes comprises at least one of health information, professional information, skill information, and preference information.

The report can include one or more of an e-mail sent to a user, a posting on social network web page, an instant message, a change of color on a graphical user interface (e.g. a red light on the computer screen), a facsimile message, a telephone call, and a sound.

In general, reports can be periodic or event-driven. In some instances, provision may be made for both kinds of reports. As seen in FIG. 4, a decision 408 can be made re what kind of report is desired. If periodic, check in decision block 410 whether it is time to proceed to block 416 and generate the report. In cases where event driven reporting is desired, a trigger function module can be stored in the memory. The trigger function module can receive information from the correlation engine (e.g., analysis module 202) to determine if the reporting module should be executed to provide the report. For example, in step 412, a settable threshold condition can be obtained (e.g., I only wish to be notified of a potential health issue if there is statistically significant chance that it will concern me at some point in my life). In step 414, see if the condition(s) are met; if so, generate a report in block 416; else, keep checking. The trigger function module can also be used to see if it is the correct time to generate a periodic report.

Note that in some cases, the attributes are indicative of at least one health condition, and the report indicates at least one health issue for a user corresponding to the subject node.

In the case of step 414, the trigger function module is configured to receive information from the correlation engine to determine if the reporting module should be executed (i.e., to get the information it needs from the correlation engine to make the determination as to whether the threshold condition has been met). As in step 412, in some cases, the trigger function module is configured to base the determination if the reporting module should be executed on a user-defined threshold, and an additional step includes obtaining data indicative of the threshold from the user. In cases where the attributes are indicative of at least one health condition, the report can indicate at least one health issue for a user corresponding to the subject node, and the user-defined threshold can correspond to a predetermined amount of risk for the at least one health condition willing to be tolerated by the user (i.e., only wants a report if severe risk; wants report if even slight risk, and so on).

Thus, the system will typically not be sending a report every minute or when there is nothing to be learned. For example, perhaps a "report" is not needed if the individual is healthy or if some condition has not been met.

In one or more embodiments, the data collection module 201 could prompt a user such as Rick 101 with appropriate attributes questions. The information about the social network could be stored in a social network data structure on a server, which will have at least one central processing unit, at least one memory, and at least one network connection. Storing could also be carried out by the data collection module 201.

In one or more embodiments of the invention, the aforementioned opt-in assent may be obtained from a user by implementing a user interface control such as, for example, a checkbox.

Reporting module 203 may provide suitable alerts to users.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
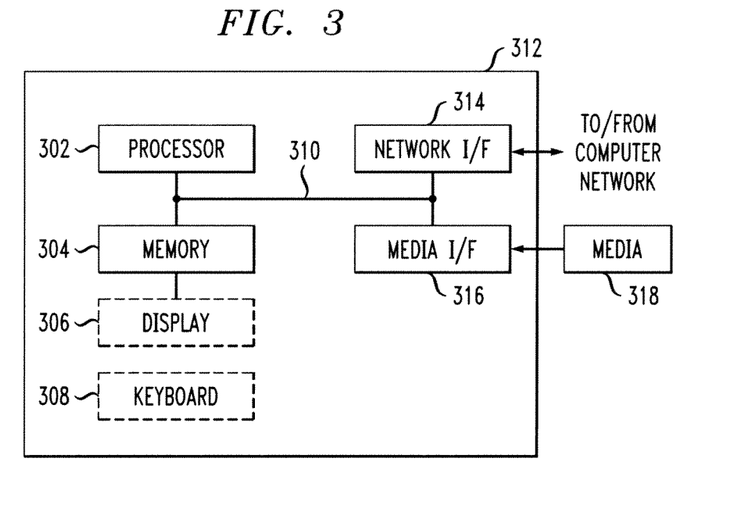
FIG. 3 depicts a computer system that may be useful in implementing one or more aspects and/or elements of the invention.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
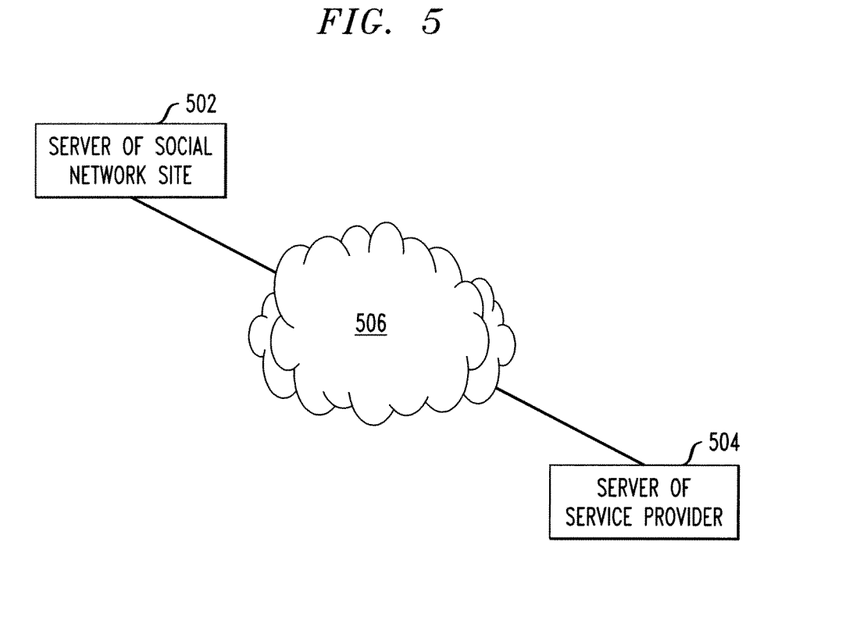
FIG. 5 depicts an exemplary architecture wherein a report service provider interacts with a social network provider.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a data collection module, an analysis module, and a reporting module. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules. The software modules can reside in a number of different locations. For example, in some instances, the reporting may be offered as a service separate from a social networking service. As shown in FIG. 5, there may be one or more servers 502 of the social networking site and one or more servers 504 of the service provider, coupled by a network 506 (in general a LAN, WAN, the global system of interconnected computer networks that use the standard Internet Protocol Suite (TCP/IP), commonly called the Internet, and so on). Users may access servers 502, 504 via, for example, Internet connection. Unit 312 is typical of servers 502 or 504, computers of individual users, and the like. The server 504 of the service provider may access the social network server 502, with permission, and possibly for a fee. Analysis module 202 may reside on the user's client (coupled to server 504 over the Internet, for example); on the server 504; or on the server 502. The reporting module and data collection module may also reside on servers 502 or 504. In some cases, the social network provider may offer the service so there may not be a separate service provider. In such cases, both servers 502, 504 may be under the control of the social network provider, or only a single server may be employed.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for analyzing social networks, said system comprising:
   a memory storing:
      a social network data structure having:
         a plurality of attributes;
         a plurality of nodes, each of said nodes corresponding to an entity and having at least one of said attributes associated with said entity, and
         at least one connection connecting at least two of said nodes;
      a correlation engine;
      a reporting module; and
      a trigger function module; and
   at least one processor, coupled to said memory, said at least one processor being operative to:
      execute said correlation engine to examine at least one of said nodes as a subject node, said subject node being coupled to at least one other one of said nodes, comprising a data node, by at least said at least one connection, said examination by said correlation engine being carried out to determine at least one of said attributes comprising a related attribute of said subject node and said at least one other one of said nodes, comprising said data node, wherein said analysis identifies a risk associated with said subject node based on one or more attributes of said at least one other one of said nodes, wherein said risk comprises an exposure to one or more of an injury and loss;
      execute said trigger function module to determine if said reporting module should be executed to provide said report if a threshold number of users within a social-network proximity of said subject node have said one or more attributes and a threshold condition is met for each of: (i) a risk level, (ii) a depth to which the social network is examined, and (iii) a determined nature of connection between nodes based on frequency of communication; and
      responsive to determining that said reporting module should be executed, execute said reporting module to provide a report indicating a correlation assessment to said subject node and indicating said risk associated with said subject node, said correlation assessment being related to said at least one related attribute.

2. The system of claim 1, wherein said attributes are indicative of at least one health condition, and wherein said report indicates at least one health issue for a user corresponding to said subject node.

3. The system of claim 1, wherein said at least one processor executes said trigger function module to receive information from said correlation engine to determine if said reporting module should be executed.

4. The system of claim 3, wherein said trigger function module is configured to base said determination if said reporting module should be executed on a user-defined threshold.

5. The system of claim 4, wherein said attributes are indicative of at least one health condition, wherein said report indicates at least one health issue for a user corresponding to said subject node, and wherein said user-defined threshold corresponds to a predetermined amount of risk for said of at least one health condition willing to be tolerated by said user.

6. The system of claim 1, wherein said at least one related attribute comprises an identical attribute.

7. The system of claim 1, wherein said at least one processor is further operative to require an opt-in assent before said attributes are stored in said memory.

8. The system of claim 1, wherein said entity comprises at least one of: a person, a business, a product, a service, an avatar in a virtual world, and a collection of persons.

9. The system of claim 1, wherein said entity comprises a person and wherein at least one of said attributes comprises at least one of: a health information, professional information, skill information, and preference information.

10. The system of claim 1, wherein said data node is connected to said subject node through a path comprising at least two interconnected ones of said nodes.

11. The system of claim 1, wherein said report comprises at least one of: an e-mail sent to a user, a posting on social network web page, an instant message, a change of color on a graphical user interface, a facsimile message, a telephone call, and a sound.

12. A method for analyzing social networks, said method comprising the steps of:
   providing a system, wherein the system comprises distinct software modules, each of the distinct software modules being embodied on a computer-readable storage medium, and wherein the distinct software modules comprise a data collection module, an analysis module, a trigger function module, and a reporting module;
   executing said data collection module on at least one hardware processor to obtain a social network data structure having:
      a plurality of attributes;
      a plurality of nodes, each of said nodes corresponding to an entity and having at least one of said attributes associated with said entity, and
      at least one connection connecting at least two of said nodes;
   executing said analysis module on said at least one hardware processor to examine at least one of said nodes as a subject node, said subject node being coupled to at least one other one of said nodes, comprising a data node, by at least said at least one connection, said examination by said analysis being carried out to determine at least one of said attributes comprising a related attribute of said subject node and said at least one other one of said nodes, comprising said data node, wherein said analysis identifies a risk associated with said subject node based on one or more attributes of said at least one other one of said nodes, wherein said risk comprises an exposure to one or more of an injury and loss;
   executing said trigger function module to determine if said reporting module should be executed to provide said report if a threshold number of users within a social-network proximity of said subject node have said one or more attributes and a threshold condition is met for each of: (i) a risk level, (ii) a depth to which the social network is examined, and (iii) a determined nature of connection between nodes based on frequency of communication; and
   responsive to determining that said reporting module should be executed, executing said reporting module on said at least one hardware processor to provide a report indicating a correlation assessment to said subject node and indicating said risk associated with said subject node, said correlation assessment being related to said at least one related attribute.

13. The method of claim 12, wherein said attributes are indicative of at least one health condition, and wherein said report indicates at least one health issue for a user corresponding to said subject node.

14. The method of claim 12, wherein said trigger function module is configured to receive information from said correlation engine to determine if said reporting module should be executed.

15. The method of claim 14, wherein said trigger function module is configured to base said determination if said reporting module should be executed on a user-defined threshold, further comprising obtaining data indicative of said threshold from said user.

16. The method of claim 15, wherein said attributes are indicative of at least one health condition, wherein said report indicates at least one health issue for a user corresponding to said subject node, and wherein said user-defined threshold corresponds to a predetermined amount of risk for said of at least one health condition willing to be tolerated by said user.

17. The method of claim 12, wherein said at least one related attribute comprises an identical attribute.

18. The method of claim 12, wherein said entity comprises a person and wherein at least one of said attributes comprises at least one of: a health information, professional information, skill information, and preference information.

19. The method of claim 12, wherein said data node is connected to said subject node through a path comprising at least two interconnected ones of said nodes.

20. An apparatus for analyzing social networks, said apparatus comprising:
means for providing a system, wherein the system comprises distinct software modules, each of the distinct software modules being embodied on a computer-readable storage medium, and wherein the distinct software modules comprise a data collection module, an analysis module, a trigger function module, and a reporting module;
means for executing said data collection module on at least one hardware processor to obtain a social network data structure having:
a plurality of attributes;
a plurality of nodes, each of said nodes corresponding to an entity and having at least one of said attributes associated with said entity, and
at least one connection connecting at least two of said nodes;
means for executing said analysis module on said at least one hardware processor to examine at least one of said nodes as a subject node, said subject node being coupled to at least one other one of said nodes, comprising a data node, by at least said at least one connection, said examination by said analysis being carried out to determine at least one of said attributes comprising a related attribute of said subject node and said at least one other one of said nodes, comprising said data node, wherein said analysis identifies a risk associated with said subject node based on one or more attributes of said at least one other one of said nodes, wherein said risk comprises an exposure to one or more of an injury and loss;
means for executing said trigger function module to determine if said reporting module should be executed to provide said report if a threshold number of users within a social-network proximity of said subject node have said one or more attributes and a threshold condition is met for each of: (i) a risk level, (ii) a depth to which the social network is examined, and (iii) a determined nature of connection between nodes based on frequency of communication; and
means for, responsive to determining that said reporting module should be executed, executing said reporting module on said at least one hardware processor to provide a report indicating a correlation assessment to said subject node and indicating said risk associated with said subject node, said correlation assessment being related to said at least one related attribute.

21. A computer program product comprising a computer readable storage medium having computer readable program code embodied therewith, said computer readable program code comprising distinct software modules, each of the distinct software modules being embodied on said computer readable storage medium, and wherein:
said distinct software modules comprise a data collection module, an analysis module, a trigger function module, and a reporting module;
said data collection module comprises computer readable program code configured to obtain a social network data structure having:
a plurality of attributes;
a plurality of nodes, each of said nodes corresponding to an entity and having at least one of said attributes associated with said entity, and
at least one connection connecting at least two of said nodes;
said analysis module comprises computer readable program code configured to examine at least one of said nodes as a subject node, said subject node being coupled to at least one other one of said nodes, comprising a data node, by at least said at least one connection, said examination by said analysis being carried out to determine at least one of said attributes comprising a related attribute of said subject node and said at least one other one of said nodes, comprising said data node, wherein said analysis identifies a risk associated with said subject node based on one or more attributes of said at least one other one of said nodes, wherein said risk comprises an exposure to one or more of an injury and loss;
said trigger function module comprises computer readable program code configured to determine if said reporting module should be executed to provide said report if a threshold number of users within a social-network proximity of said subject node have said one or more attributes and a threshold condition is met for each of: (i) a risk level, (ii) a depth to which the social network is examined, and (iii) a determined nature of connection between nodes based on frequency of communication; and
said reporting module comprises computer readable program code configured to, responsive to said determining that said reporting module should be executed, provide a report indicating a correlation assessment to said subject node and indicating said risk associated with said subject node, said correlation assessment being related to said at least one related attribute.

22. The computer program product of claim 21, wherein said attributes are indicative of at least one health condition, and wherein said report indicates at least one health issue for a user corresponding to said subject node.

23. The computer program product of claim 21, wherein said trigger function module is configured to receive information from said correlation engine to determine if said reporting module should be executed.

24. The computer program product of claim 23, wherein said trigger function module is configured to base said determination if said reporting module should be executed on a user-defined threshold, further comprising computer readable program code configured to obtain data indicative of said threshold from said user.

25. The computer program product of claim 24, wherein said attributes are indicative of at least one health condition, wherein said report indicates at least one health issue for a user corresponding to said subject node, and wherein said user-defined threshold corresponds to a predetermined amount of risk for said of at least one health condition willing to be tolerated by said user.

26. A medical alert system comprising:
    a memory storing:
        a social network data structure having:
            one or more attributes indicative of at least one health condition;
            a plurality of nodes, each of said nodes corresponding to a person and having at least one of said attributes indicative of at least one health condition associated with said person, and
            at least one connection connecting at least two of said nodes;
        a correlation engine;
        a reporting module; and
        a trigger function module; and
    at least one processor, coupled to said memory, said at least one processor being operative to:
        execute said correlation engine to examine at least one of said nodes as a subject node, said subject node being coupled to at least one other one of said nodes by at least said at least one connection, said examination by said correlation engine being carried out to identify a health risk associated with said subject node based on one or more attributes indicative of at least one health condition of said at least one other one of said nodes;
        execute said trigger function module to determine if said reporting module should be executed to provide a report indicating at least one health issue for a user corresponding to said subject node if a threshold number of users within a social-network proximity of said subject node have said one or more attributes and a threshold condition is met for each of: (i) a risk level, (ii) a depth to which the social network is examined, and (iii) a determined nature of connection between nodes based on frequency of communication; and
        responsive to determining that said reporting module should be executed, execute said reporting module to provide said report indicating said at least one health issue for said user corresponding to said subject node.

\* \* \* \* \*